United States Patent [19]

Brennen et al.

[11] Patent Number: 4,743,832
[45] Date of Patent: May 10, 1988

[54] PROTECTION SYSTEM FOR THYRISTOR-CONTROLLED REACTORS

[75] Inventors: Michael B. Brennen, Pittsburgh; Laszlo Gyugyi, Penn Hills, both of Pa.

[73] Assignee: Westinghouse Electric Corp., Pittsburgh, Pa.

[21] Appl. No.: 8,976

[22] Filed: Jan. 30, 1987

Related U.S. Application Data

[63] Continuation-in-part of Ser. No. 942,882, Dec. 17, 1986.

[51] Int. Cl.⁴ .............................. G05F 1/70; H02J 2/18
[52] U.S. Cl. .................................................... 323/211
[58] Field of Search ....................... 323/209, 210, 211; 363/160, 164

[56] References Cited

U.S. PATENT DOCUMENTS

3,989,999  11/1976  Thompson et al. .
3,999,117  12/1976  Gyugyi et al. .

Primary Examiner—Patrick R. Salce
Assistant Examiner—Judson H. Jones
Attorney, Agent, or Firm—C. M. Lorin

[57] ABSTRACT

To a static VAR generator of the split reactor type, a scaled down model is associated to be controlled concurrently with the static switches of the split reactor and to generate under proportional line voltage a simulated reactive current which is matched with the actual reactive current to detect a flashover across one of the two halves of the split reactor.

12 Claims, 7 Drawing Sheets

PROTECTION SYSTEM FOR THYRISTOR-CONTROLLED REACTORS

CROSS-REFERENCE TO RELATED APPLICATION

This application is a continuation-in-part of copending U.S. patent application Ser. No. 942,882, filed Dec. 17, 1986.

BACKGROUND OF THE INVENTION

The invention relates to the field of electrical protection in general, and more particularly to the protection of thyristor-controlled reactors.

In electrical apparatus and on power lines, there is a need for protection against overvoltage, overcurrent, faults, surges and breakdowns. Protective measures range from remedial action to equipment shutdown. These may be triggered immediately, like a fuse or a switch, or they may involve initial steps of detection of the occurrence of the event with an appraisal being made of the size of the danger before taking any drastic action, like a shutdown.

The present invention lies in a small scale simulating circuit providing a live reproduction of the operative apparatus to be protected. It is particularly applicable to the thyristor-controlled reactors as are used for VAR compensation on power lines.

Protection of thyristor-controlled reactors against overcurrent is known from U.S. Pat. No. 3,989,999 of M. B. Brennen and F. T. Thompson. There, a predetermined delay intervenes before causing shutdown.

Another form of protection for thyristor-controlled reactor is the detection of insulation "leakage" or "flashover" current.

The thyristor-controlled reactor, as shown in the afore-mentioned Brennen and Thompson patent, involves reactors connected across the power lines through switches controlled for regulating the buildup of reactive power which effects power factor compensation in conjunction with capacitors on the high voltage transmission lines. Typically, the power switches are high voltage thyristor valves inserted between two high power reactors. This is known as a split reactor arrangement. The thyristor-controlled reactor (TCR) is usually connected to the secondary windings of the main transformer which belongs to the static VAR generator (SVG). Two reactors are used in order that the thyristor can react to limit the fault current as it develops through one reactor which fails, for instance by flashover, thereby avoiding on a single reactor a total shorted turns or flashover situation involving the overall TCR, so that very high fault currents would result that the valve would not be able to handle. The invention will protect the valve from being damaged under such circumstances. It is a protection which may be added to the other forms of protection in a static VAR generator, such as the afore-mentioned overcurrent and differential current protections for thyristor-controlled reactors.

In many applications, a static VAR generator (SVG) is connected to high voltage utility company transmission lines (typically, at more than 100 kv) to provide reactive power compensation. It is possible that the transmission line voltage increases significantly under certain conditions. This may cause an increase up to two per unit lasting for several line voltage cycles. Since in a static VAR generator, the thyristor-controlled reactor (TCR) is connected between lines, the TCR is exposed to such overvoltage condition. Therefore, a reactor failure may occur at any thyristor firing angle and voltage level under voltage conditions ranging from less than nominal to the one corresponding to a line voltage transient as specified for a given UGT installation.

Protection of the TCR must be provided for the worst overvoltage condition to be expected. First, failure of a reactor should be detected as soon as possible. If it is the case for one of the two reactors involved, trip should be initiated immediately to prevent the voltage stress from building up on the other reactor, thereby to protect the thyristor valve.

The problem in detecting reactor failure lies in that in the phase-controlled operation of the TCR, the current may remain below the nominal current level even when the line voltage increases above its nominal value. Therefore, with a fixed set point overcurrent detector, such as known in the prior art, reactor failure cannot be detected under all line voltage and phase angle conditions. For instance, with a current differential protection, that is, a system which senses the two currents on the respective reactors and detects a critical difference therebetween, there may be a difference of current detected if there is a leakage, for instance due to breakdown of an insulator on one side. Nevertheless, if there is a fully, or partially shorted reactor, this will not produce a differential current because the same current flows through the system. What is needed, is a detection system which is sensitive to both the voltage levels and the firing angles.

A solution to the problem, according to the present invention, consists in establishing a small scale electronic model of the TCR. The model is mounted across control level voltages that are proportional to the high voltage bus lines. Because it is an electronic model, it does not fail due to overvoltage like would the reactors in a true device, and it will always carry a current representing the acceptable operational current for a given firing angle of the thyristor valve and under the operative voltage. The small scale model operates as an equivalent circuit, like an observer, and provides a scaled down representative current which is matched in magnitude with the transformer sensed current of the operative TCR. Should a critical event, like a flashover, affect one of the reactors, the sensed current will no longer have the normal operation magnitude. Therefore, critical discrepancy will appear between the reference signal derived from the scaled model and the actual signal derived from the TCR.

SUMMARY OF THE INVENTION

In a static VAR generator for transmission lines, wherein a split reactor is used having a static power switch unit to control the reactive current passing therethrough, a scaled-down model is operated under a voltage which is proportional to the voltage across the transmission lines and controlled by the same control signals as those controlling the static power switch unit, so as to generate a current simulating the reactive current passing through and from the split reactor. The outputted simulated reactive current is combined with the actual reactive current to detect a flashover on the split reactor.

DESCRIPTION OF THE INVENTION

The basic operation and control of a static VAR generator (SVG) have been described, typically, in U.S. Pat. Nos. 3,999,117 and 3,989,999 in the context of thyristor-controlled reactors (TCR's), i.e. of reactors generating a reactive current on the transmission lines in accordance with the extent to which the thyristors are being controlled for conduction i.e. at a specific firing angle between 90° and 180° in relation to the transmission line voltage. The two U.S. Pat. Nos. 3,999,117 and 3,989,999 are hereby incorporated by reference.

The TCR is a vital power component of the static VAR generator (SVG). In its preferred form, it consists of a high voltage thyristor valve inserted between two (split) high power reactors (inductors). The TCR is generally mounted across the secondary windings of the main power transformer of the SVG. Instead of placing a single reactor in series with the thyristor (or thyristors), it is preferred to split the value of the reactor into two separate reactors, while placing the thyristor (or thyristors) in between. The effect of splitting into two reactors is to limit the fault current through the valve (or valves) which would occur should one of the reactor fail. Such failure would happen under shorted turns, or flashover, on the reactor. The result would be very high fault currents that the valve would be unable to handle.

Figure 1:
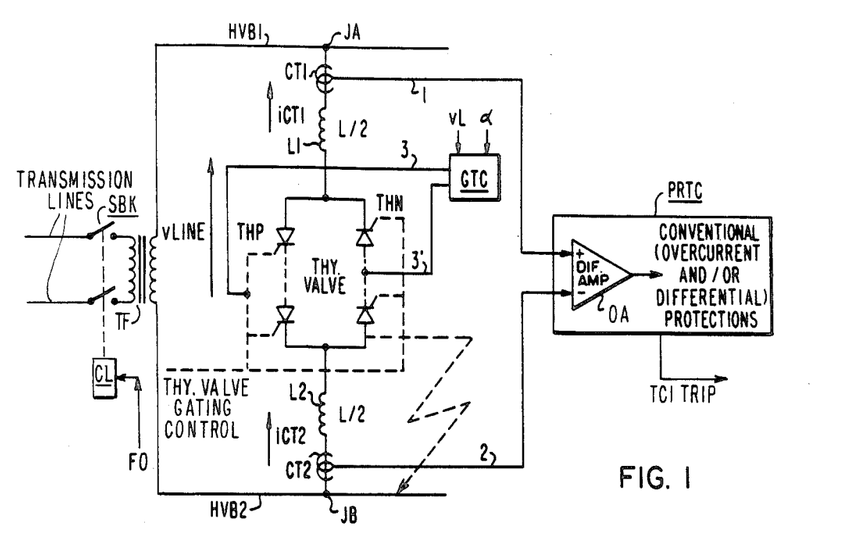
FIG. 1 shows thyristors inserted between split reactors in a static VAR generator and conventional overcurrent and differential current protection associated therewith.

FIG. 1 shows protection of the TCR's in accordance with the prior art. It includes:

(1) overcurrent protection, typically as carried out under the teachings of U.S. Pat. No. 3,989,999; and (2) current differential protection with the primary purpose of detecting an insulation "leakage" or "flashover" current.

The TCR unit is shown to include split reactors L1 and L2 with antiparallel thyristors THP, THN inbetween. They are mounted between junctions JA, JB across the high voltage bus lines HVB1, HVB2, respectively. The thyristors are controlled as to their firing angle (namely between 90° and 180° on the line voltage peak) by a gating circuit GTC responding to the timing wave of the line voltage vL and to the reference angle. The gating pulse are applied by lines 3,3' to the gating electrodes of the thyristors THP on the positive side. THN on the negative side. Current sensors CT1, CT2 are applied to each input (or output) of the respective reactors (L1, L2) in order to provide on lines 1, 2 a signal representing the current flowing in the corresponding reactor. An overcurrent and/or differential protection circuit PRTC, such as disclosed in the prior art is provided to respond to the signals of lines 1 and 2. A differential amplifier in the form of an operational amplifier OA, for instance, will derive the difference between the two currents in reactors L1, L2, thereby indicating any anomaly in the normally even flowing of current through the TCR unit. Other conventional features include means for detecting an overcurrent in the current flow through the reactors and the thyristor valves. Whenever a critical value is reached within circuit PRTC, a command to trip the static VAR generator altogether, is outputted on line TC1.

The failure of any reactor in the TCR should be detected as soon as possible, to be able to initiate tripping so as to protect the thyristor valves and remove the increased voltage stress from the remaining, but still operational, reactor. Reactor failure detection is hampered by the fact that in the course of phase controlled operation of the TCR, the current may remain below the nominal current level, even when the line voltage increases above its nominal value. Therefore, current sensing would not be indicative of such critical occurrence. Accordingly, a fixed set point overcurrent detector, as conventionally provided in the prior art within circuit PRTC of FIG. 1, will be unable to respond to a reactor failure under all line voltage and phase angle conditions.

Figures 2, 2A:
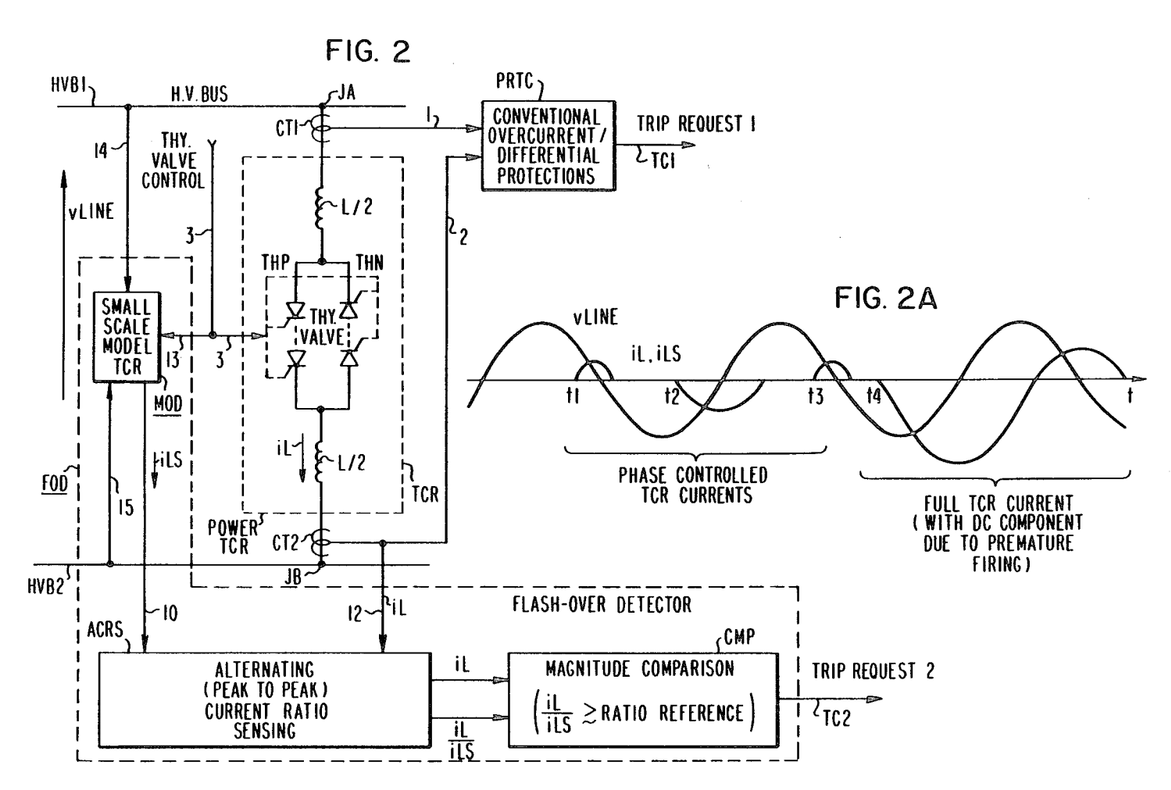
FIG. 2 shows the flashover detector according to the present invention associated with apparatus like shown in FIG. 1.
FIG. 2A illustrates with curves the generation of phase-controlled thyristor-controlled reactors (TCR) currents like in FIGS. 1 or 2.
Figure 3:
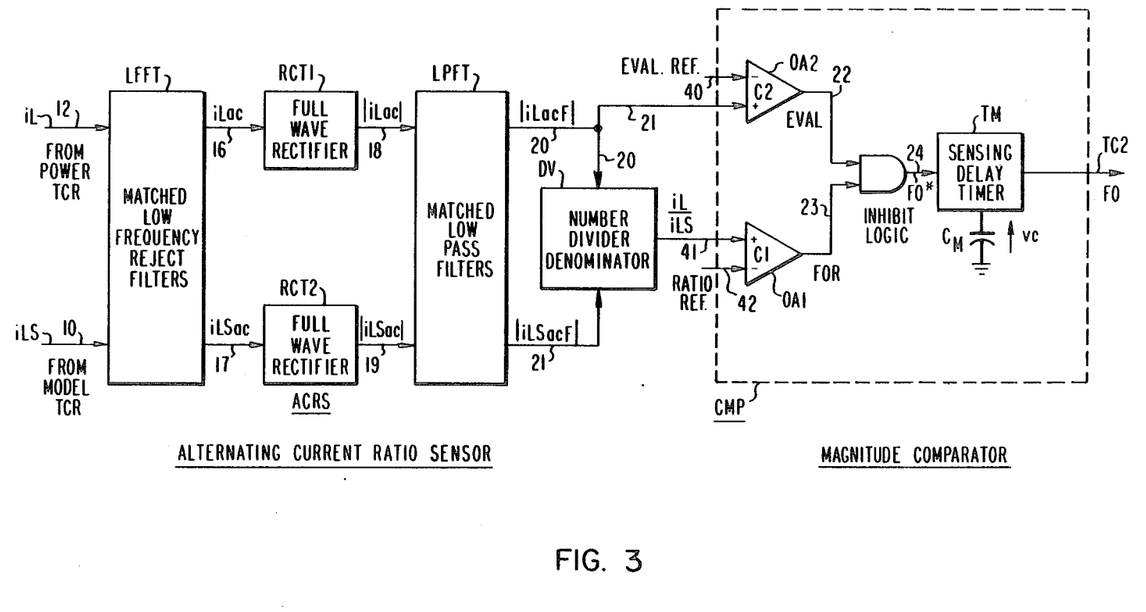
FIG. 3 is a block diagram illustrating the alternating current ratio sensor and the magnitude comparator which are part of the flashover detector of FIG. 2.
Figure 4:
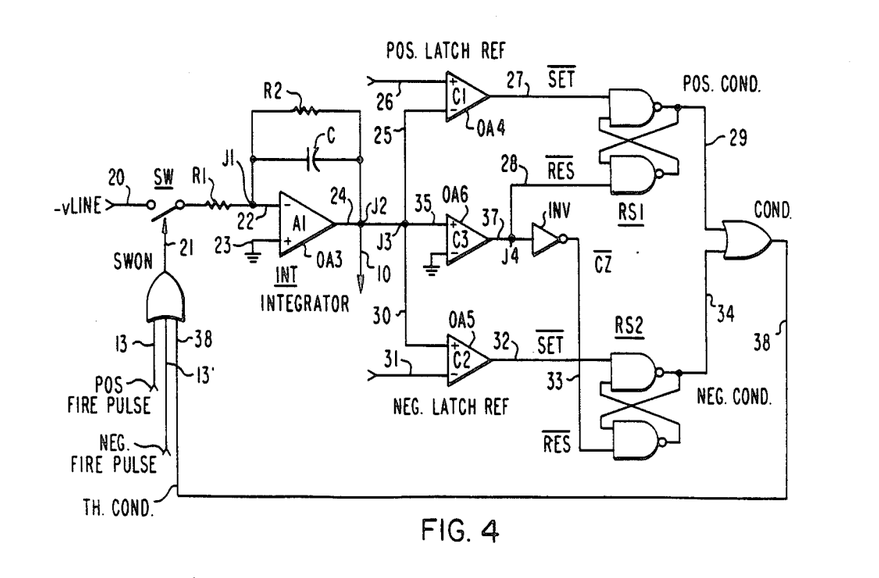
FIG. 4 is circuitry illustrating as one embodiment the implementation of the small scale TCR model which is part of the circuit of FIG. 2.

Moreover, with the current differential protection, illustrated in FIG. 1 by operational amplifier OA, the difference between the two currents can be measured. The imbalance occurs when a portion of the TCR current leaks through, for instance through an insulator between the valve and one of the reactors. Operational amplifier OA will detect the difference between the two current transformer (CT1, CT2) outputs which develop. Therefore, an insulator breakdown between the reactors will be detected irrespective of the voltage level, or of the firing angle. However, should one reactor be fully, or partially, shorted, the current is increased, but the same current will flow through both current transformers and operational amplifier OA will not detect a differential current. Some means must be provided supplementing the conventional overcurrent and/or differential protection afforded by the circuit of FIG. 1 for the valves and the reactors, in case of reactor insulation failure, i.e. flashover. FIGS. 2, 3 and 4 illustrate such means.

Referring to FIG. 2, to the conventional overcurrent differential protection circuit PRTC has been added a flashover detector FOD comprising a small scale TCR model MOD connected across the high voltage bus lines, and a detection circuit responsive to the current iL sensed across the TCR unit and the simulated current iLS generated by the small scale TCR model MOD. Such detection circuit generates on line TC2 a trip command in case of flashover, which complements the trip command of line TC1 from the PTRC circuit. FIG. 3 illustrates the alternating (peak to peak) current ratio sensing circuit ACRS, and the magnitude comparator CMP which detects when the ratio iL/iLS exceeds a reference value and it generates the command for line TC2. FIG. 4 illustrates one implementation of the small scale TCR model MOD.

Referring to FIG. 3, current iL derived on line 12 from line 2 and current sensor CT2 (FIG. 1) is in principle the same current indication as derived on line 1 from current sensor CT1 (FIG. 1). Current iLS is the current outputted by the small scale TCR model MOD which on line 10 simulates at a different scale the current iL flowing in the TCR unit. Lines 12 and 10 go to a low frequency rejection folter circuit LFFT outputting on respective lines 16, 17, signals iLac and iLSac which are the signals of line 12 and 10 in alternating current form and quasi fundamental form. Both signals are then rectified by a full wave rectifier (RCT1 for line 16; RCT2 for line 17), thereby yielding absolute values iLac on line 18 and iLSac on line 19. Matched low pass filters within circuit LPFT provide signals iLacF on line 20 and iLSacF on line 21, which go to the numerator and the denominator input, respectively, of a divider DV generating on line 41 the ratio iL/iLS. Thus, line 41 is the output line of the alternating current ratio sensor ACRS just described.

The magnitude comparator of FIG. 3 includes two comparators C1 (built around operational amplifier OA1) and C2 (built around operational amplifier OA2). OA1 receives a ratio reference signal on line 42 applied to its inverting input, whereas line 41 applies the signal iL/iLS to its non-inverting input. When the ratio iL/iLS exceeds the set reference ratio of line 42, a critical signal appears on line 23 which goes through an AND device imposing an enabling condition as derived from comparator C1. Similarly, a magnitude level reference signal is applied on line 40 to the inverting input of operational amplifier OA2 for comparator C2, while line 21 is derived from line 20 to apply the absolute value iLacF to the non inverting input of OA2. The inhibit logic EVAL is outputted on line 22, whenever the amplitude of the signal of lines 20, 21 is lower than the imposed reference, thereby imposing a minimum current through the reactors before detecting any flashover. The AND device leads by line 24 to a sensing delay timer TM which imposes a time constant to the generated signal, thereby smoothing the critical signal FO* which characterizes the flashover occurrence and is translated into a command signal FO on line TC2 for effective shutdown. As shown in FIG. 1, the transmission lines are coupled to lines HBY1, HBY2 via a transformer TF and a switch breaker SBK is provided controlled by a coil CL commanded by the command signal FD in case of shutdown.

The TCR model MOD of FIGS. 2 or 4 is fired (or gated) by line 13 under the same conditions as are fired the thyristor valves of the TCR unit (line 3). The simulated reactor current iLS is identical in phase and magnitude to the current iL flowing in the TCR unit. The TCR model is such that no flashover can occur in the low voltage model, when a flashover occurs in the TCR unit. When a flashover occurs in the TCR unit, the reference of line 42 is such that, typically, $(i_L/i_{LS})=2$. This is equivalent to $(i_L-i_{LS})=i_{LS}$. The current ratio is continuously measured by circuit ACRS.

FIG. 2A shows the phase controlled TCR currents initiated at successive instants t1,t2,t3,t4. At instant t4, there is a full TCR current generated due to a premature firing, that is when firing is initiated before the peak of the applied voltage (it being understood that firing for the generation of reactive current relative to the line voltage vL, is normally chosen to occur at a firing angle falling between 90° and 180°). As a result, there appears to be a DC component which may be large, even though no flashover occurs. The current is typically detected by iron-cored current transformers (CT1 and CT2), thereby to reject the DC component due to their time constants, thus, acting as a high pass (HP) filter. Taking the ratio of such HP filtered and of the unfiltered simulated current may result in a false indication. Therefore, the DC component in both the power (iL) and the simulated (iLS) currents is rejected by filtering and only the peak to peak (alternating current) components are taken in consideration by the ratio sensor ACRS.

Since the iL/iLS ratio obtained during small, near zero-crossing, current magnitudes would not be as accurate, the comparator CMP is arranged so as to ignore such marginal values. The ratio is evaluated by comparator C2 only when iL exceeds the reference value (EVAL REF) of line 40, a value chosen to be safely above the error and noise levels of the ratio sensing circuit ACRS. The magnitude comparator CMP also includes a filter (timer TM on FIG. 3) represented by a capacitor CM which establishes a time constant under voltage vc. The timer provides a final filtering before the generation of the critical command FO on line TC2 and it introduces a delay preventing an untimely reaction to a transient situation.

The purpose of the low-pass filter introduced between lines 18, 19 and lines 20, 21, is to prevent the effective signals iLacF and iLSacF from decreasing to zero around the actual current zero crossings. This filter will keep the output signal of the current ratio computer (divider DV) valid throughout the current half-cycles during a flashover.

The output signal of the divider DV is monitored by comparator C1, the reference being, typically, 1.5. It is observed that the divider indicates the actual current ratio correctly under both phase controlled and full current conditions in the TCR unit. The purpose of comparator C2, operating with an "evaluation reference" on line 40, is to increase the noise immunity of the detection like with the matched low pass filters LPFT. It inhibits the output signal FOR of line 23 from comparator C1 from following the sensing delay timer TM until the ratio is accurately indicated by the instantaneous reactor current magnitude. The inhibition function is provided by the AND device responding to lines 22 and 23, whenever outside the "evaluate" (EVAL) interval. The gated (EVAL AND FOR) outputs (22 and 23) result on line 24 in a "flashover reference" signal FO*, which is the input signal to the sensing delay timer TM. The trip command FO is provided at the output on line TC2 in case of a flashover.

Referring to FIG. 4 one possible implementation of the TCR model MOD is illustrated. An integrator INT built around an operational amplifier OA3 receives, between the inverting input on line 22 and the ground line 23 of the non-inverting input, the line voltage vL applied through a switch SW from line 20 when the switch is closed. The time constant for the integration is provided by a resistor R1 (between switch SW and input line 22) and a capacitor C in the feedback loop from the output line 24 and junction J2 on to junction J1, on line 22. A resistor R2 is connected in parallel (between J1 and J2) to capacitor C so as to introduce a characteristic representing the Q of the reactor (L1 and L2) of the TCR unit which is being simulated by the integrator function. When the switch SW is closed upon an existing voltage vL (the same as for the TCR unit), there is a buildup of current through the integrator, which appears at the output on line 10 from junction J2. This is the current iLS simulating the reactive current iL built up in the TRC unit. As shown in FIG. 2A, upon firing of the thyristor valves (at instants t1, t2, or t3) the reactive current iL (as shown in FIG. 2A) builds up from the firing instant and lasts until the current falls back to zero. Similarly, in the small scale TCR model of FIG. 4, the simulated current of line 10 is initiated by the same firing pulse of line 3 to the TCR unit, derived to the model by lines 13 (for the positive firing) and 13' (for the negative firing) causing, via the OR device and by line 21, switch SW to close upon the front edge of the pulse. The current monitor circuit, which from junctions J2 and J3 responds to the outputted current of line 20, provides for a command, via the OR device of line 21, to close the switch SW for the total duration of current iL, owing to the characteristic of the integrator as a function of the line voltage vL. Junction J3 goes by line 25 to a comparator C4 for the positive firing side, to comparator C5 for the negative firing side. The second input of the operational amplifier, in each instance, receives on lines 26 and 31, respectively, a reference signal which establishes a threshold level for current iLS to latch. Accordingly, via line 27 and flip flop RS1 for C4, via line 32 and flip flop RS2 for C5, is established beyond an OR device onto line 38, a condition COND which on line 21 (beyond the early-mentioned OR device) will maintain switch SW closed despite the expiration of the original firing pulse of line 13, or line 13'. However, when signal iLS on lines 24, 10 and junctions J2, J3, goes to zero, by line 35 this is detected this is inputted into a comparator C3. The second input thereof has a reference zero from line 36, thereby to detect the occurrence of iLS going to zero. As a result, by line 28 for the positive flip flop RS1, by line 33, after inverting, for negative flip flop RS2, the flip flop is reset, thereby cancelling the condition COND on line 38, and opening by line 21 switch SW.

Figure 5:
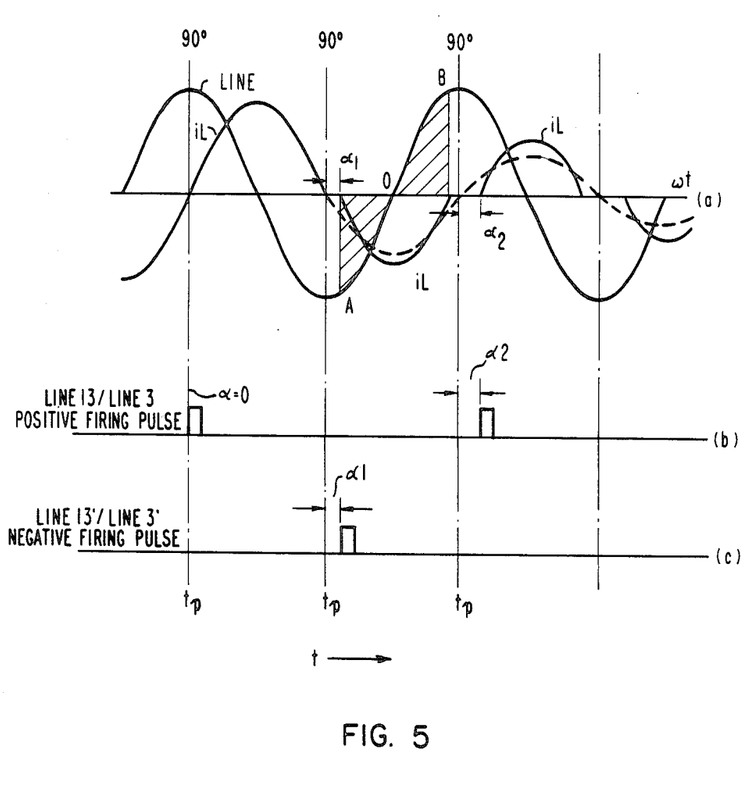
FIG. 5 shows curves illustrating the generation of reactor current in response to the thyristor firing angle in the thyristor-controlled split reactor TCR system of FIGS. 1 or 2.

Referring to FIG. 5, the firing pulse signals of lines 3, 13 and 3', 13' are shown below the voltage and current curves under firing commands at instants tp for $\alpha=0$, $\alpha=1$ and $\alpha=2$, as counted each time from peak value on the voltage curve. Considering the 1 firing condition, the current iL is initiated at $90° + \alpha 1$ and it lasts for a duration such that the areas on both sides of the zero-crossing, which follows on the vL line voltage curve, are equal. This is what the small scale model is simulating with the integrator.

Figure 6:
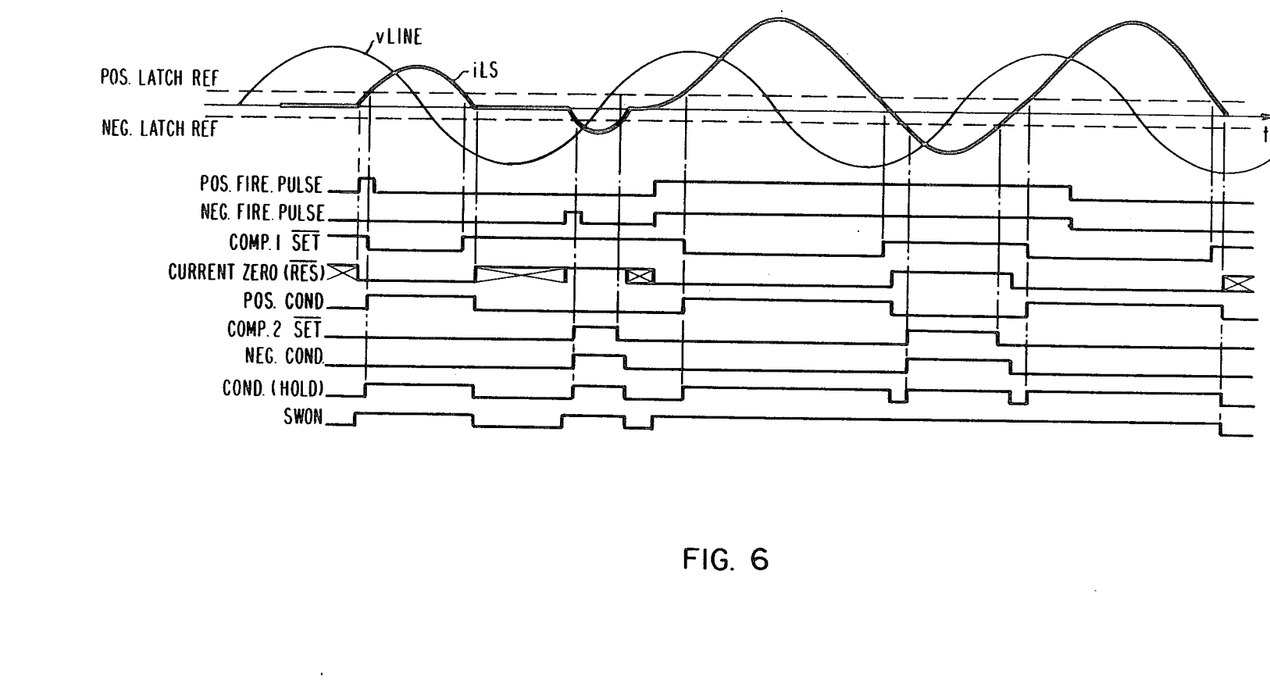
FIG. 6 illustrates with curves the operation of the small scale TCR model of FIG. 4.

Referring to FIG. 6, under (a) are shown the vL line voltage and the iLS current in relation with the operation of the small scale TCR model by a series of characteristic curves as follows:

Under (b) are the positive and negative firing pulses. With its front edge the firing pulse initiates the closing of the switch SW and starts the integration. When iLS by lines 24 and 25, for the positive firing side, exceeds the positive latch reference of line 26, flip flop RS1 is set (SET) as shown by curve (c), and the reset (RESET) is shown by the complementary curve under (d). When iLS goes below the latch reference level of line 26, the curve (c) has its front edge. When iLS goes to zero, the zero comparator CZ causes RES to reset flip flop RS1, as shown by the front edge of curve (d) and the trailing edge of curve (e), which is also indicative of the state of curves (i) and (j) for the COND command. The same can be said with regard to the negative firing side under the signals of lines 13' and 31.

Figure 7A:
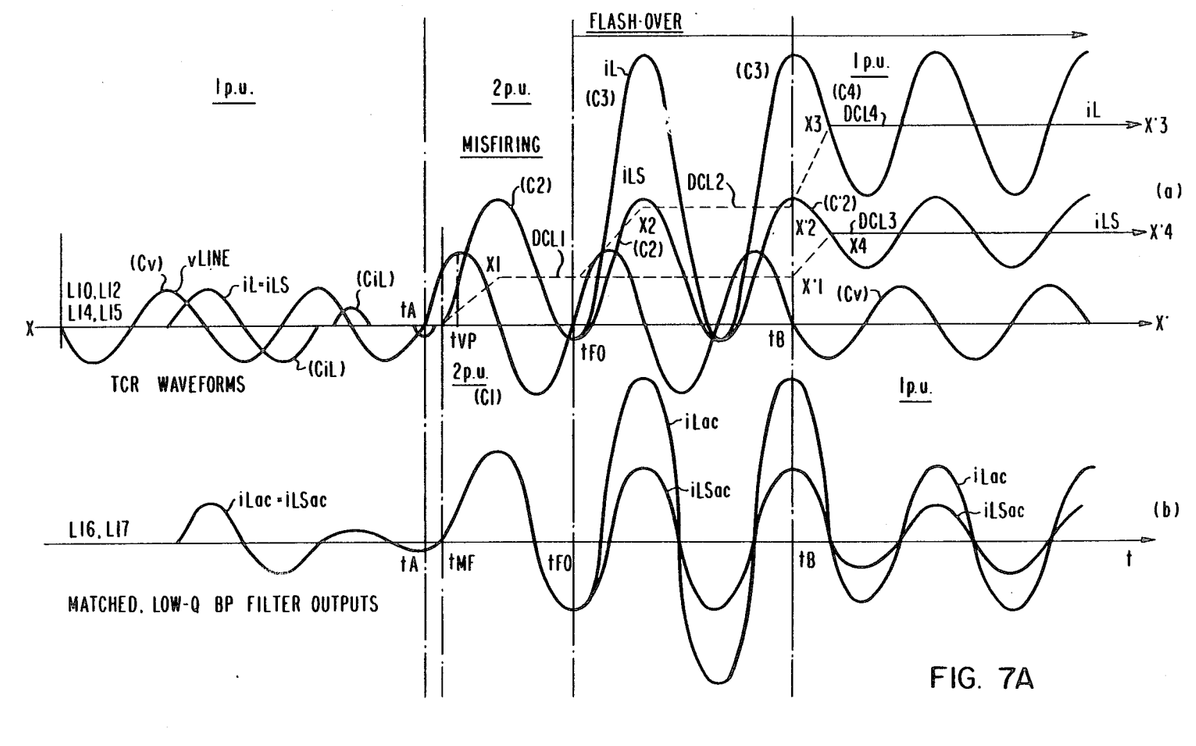
FIGS. 7A and 7B are curves illustrating the TCR currents, the TCR model currents, in different situations, their translation into detectable signals by the alternating current ratio sensor and magnitude comparator circuits of FIG. 3, as well as the command signal derived therefrom in case of a flashover.
Figure 7B:
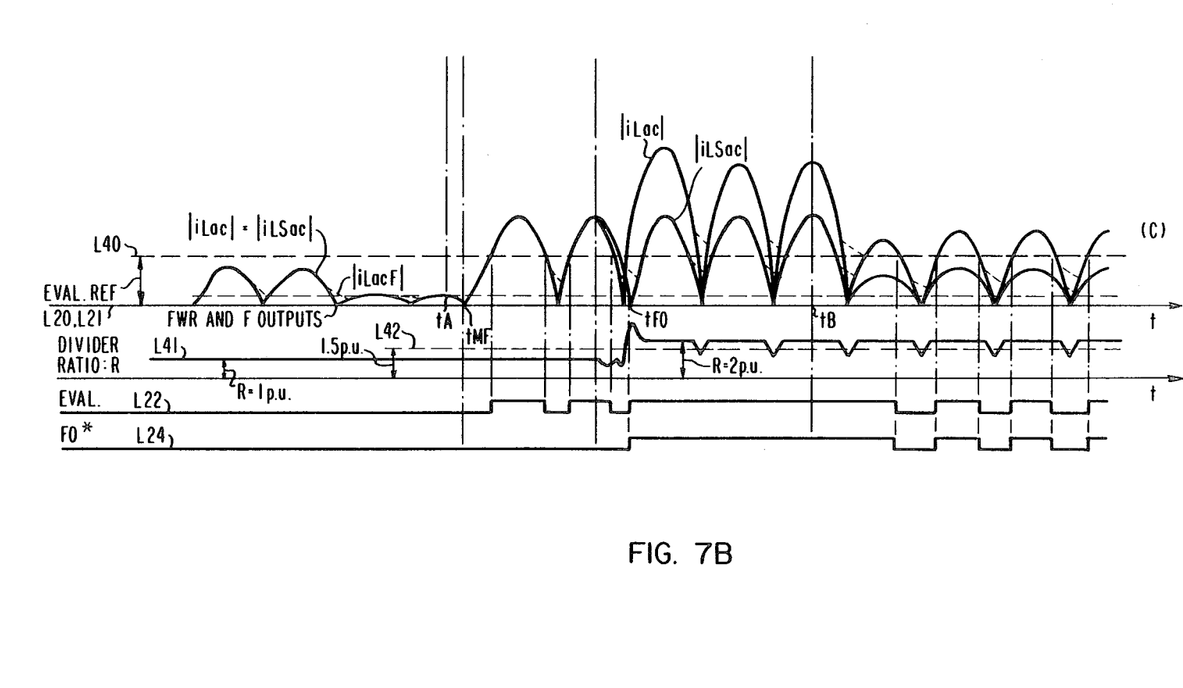

Referring to FIGS. 7A and 7B, three groups of curves are successively represented as follows:

(a) events which indicate: first a 1 p.u. level for the line voltage vL; secondly a jump to the 2 p.u. level at instant tA followed (1) by a misfiring at instant tMF, and (2) a flashover at instant tFO; and a return to the 1 p.u. level after instant tB.

(b) the effect of these events on the generation of the two currents iLac and iLSac within the small scale TCR model, are shown with curves.

(c) the generation of ensuing commands according to the circuit of FIG. 3 is illustrated by curves representing the internal and outputted signals.

Thus, on FIG. 7A are shown the line voltage vL and the signals of lines 14, 15, 10, and 12, respectively, which are first equal to one another. When line voltage increases to the level 2 p.u. (after instant tA), the curve Cv for the line voltage becomes C1, i.e. a curve with double peak to peak magnitude in the example. Upon misfiring (at instant tMF) current iL experiences a DC component developing with the reactor, as shown by the new axis X1, X1', instead of the axis XX' previously. Curve C2 indicates the increased alternating current iL=iLS which is building up upon the DC component shown by axis X1X1'. At instant tFO occurs a flashover. This causes another DC component (shown by axis X2X2') to occur with a much larger alternating current riding upon it (curve C3), namely iL for the affected reactor. The small scale model still shows iLS (curve C2) as before; but the two currents are no longer of the same magnitude. There is even a strong difference. At instant tB, as shown by curves under (a), the line voltage returns to normal, i.e. 1 p.u. However, the lower voltage does not allow the reactors to readjust quickly, and there is a DC component buildup, as shown by axes X3X3' instead of X2X2' for current iL, and X4X4' instead of X1X1' for iLS. Curve Cv is restored on its axis XX' as before instant tA.

The matched low frequency rejection filter circuit LFFT eliminates the DC components, and curves (b) show the resulting alternating signals iLac and iLSac. Curves (c), in FIG. 7B include the rectified currents iLac and iLSac appearing on lines 20, 21 at the output of the matched low pass filter circuit LPFT. On the same curves is shown the (EVAL REF) reference signal of line 40 to comparator C2 of FIG. 3. By dashed lines is shown the effect of the low pass filter preventing the filter rectifier signals from decreasing to zero around the actual current zero-crossings.

Curves (c) also include the divider ratio as derived on line 41 and the associated reference of line 42 in comparator C1. The latter is set at 1.5 p.u., typically, while the actual level of line 41 is shown to set itself at 2 p.u. during flashover, namely after instant tFO. The curves representing the states of lines 22 and 24 for signals EVAL and FO*, respectively, are also shown. It appears that the steady "high" state of signal FO* appears beyond instant tFO, due to the combination of lines 22 and 24.

Shutting down of a static VAR generator, or compensator, as done here in response to the command signal FO outputted by timer TM in case of a flashover, is conventional in this art. For the purpose of illustration, the article by A. Olwegard, K. Walve, G. Waglund, H. Franf and S. Torseng in IEEE Transactions Vol. PAS-100 No. 8, August 1981, pp. 3930–3937, is hereby incorporated by reference, especially FIG. 4 therein on page 3931. There, is shown a combined TSC/TCR type of static VAR compensator coupled to the high voltage transmission line through a transformer. Shutting down of the static VAR compensator only requires a circuit breaker inserted, for instance, on the high voltage side of the transformer and controlled by the command signal FO.

We claim:

1. In a static VAR generator including first and second reactors connected in series between two transmission lines; at least two static power switches being mounted in antiparallel fashion between said first and second reactors; and means for controlling for conduction said static power switches alternately for each polarity with a selected phase angle established relative to the peak value of the AC voltage existing between said transmission lines, for generating with said first and second reactors a controlled reactive current iL added to said transmission lines for VAR compensation; the combination of:
 integration means for outputting an output in response to an input thereof;
 simulator means responsive to said controlling means for operatively connecting the input of said integration means to said transmission lines to derive from the voltage thereof an output current initiated concurrently with said controlled reactive current iL;
 means responsive to said output current for disconnecting said simulator means from said transmission lines when said output current goes to zero magnitude;
 whereby said output current is a current iLS simulating said reactive current iL;
 means responsive to at least one of said first and second reactors for deriving a signal representative of said reactive current iL;
 divider means responsive to said reactive current iL representative signal and to said output current for deriving a signal representative of the ratio iL/iLS;
 means responsive to said ratio representative signal for deriving a command signal when said ratio representative signal exceeds a predetermined critical level; and
 means responsive to said command signal for shutting down the static VAR generator.

2. The VAR generator of claim 1 with said command signal deriving means including:
 (a) first comparator means responsive to said reactive current representative signal and to a threshold signal for deriving an enabling signal when said reactive current representative signal exceeds said threshold signal;
 (b) second comparator means responsive to said ratio representative signal and to a ratio reference signal for driving a flashover indicative signal; and
 (c) means responsive to said enabling signal and to said flashover indicative signal for generating said command signal.

3. The VAR generator of claim 2 with filtering means associated with said command signal generating means for establishing a time constant in said command signal.

4. The VAR genertor of claim 3 with first low frequency rejection filtering means being provided between said output current of said integration means and said divider means.

5. The VAR generator of claim 4 with second low frequency rejection filtering means being provided between said reactive current representative signal and said divider means.

6. The VAR generator of claim 4, with first full wave rectifier means being inserted after said first low frequency rejection filtering means.

7. The VAR generator of claim 5, with second full wave rectifier means being inserted after said second low frequency rejection filtering means.

8. The VAR generator of claim 6 and 7, with low pass filter means being inserted after said first and second full wave rectifier means.

9. The VAR generator of claim 1 including: first means associated with said first reactor for deriving a first controlled reactive current representative signal, second means associated with said second reactor for deriving a second controlled reactive current representative signal; means responsive to the difference between said first and second controlled reactive signals for deriving a second command signal when said difference exceeds a predetermined critical limit.

10. The VAR generator of claim 1 with means responsive to an overcurrent condition in said reactive current for generating a third command signal.

11. The VAR generator of claim 1 with said simulator means including:
 switch means having an opened and a closed position, said integration means input being connected to said transmission lines when in said closed position, and said switch means being transferred to said closed position by said controlling means when said static power switches are controlled for conduction, latch means responsive to said output current for establishing a latched condition for said switch means;
 said switch means being transferred to said opened position in response to said disconnecting means.

12. In an apparatus connected between voltage terminals through at least two antiparallel static switches, said static switches being controlled for conduction to establish current therethrough under the voltage of said terminals in accordance with a predetermined physical function characteristic of said apparatus;
 means for simulating intrinsically said physical function of the apparatus under identical current flow and applied voltage;
 said simulating means being connected to said voltage terminal through at least one auxiliary switch;
 said static switch and said auxiliary switch being controlled concurrently and in parallel;
 means being provided for sensing current flow in said apparatus for deriving a first current representative signal;
 means being provided for deriving with said simulating means a second signal representative of current flowing in said simulating means; and
 means responsive to said first and second current representative signals for detecting a magnitude relationship therebetween as an indication of an abnormal operative condition in said apparatus.

* * * * *